United States Patent
Sivan et al.

(10) Patent No.: US 8,976,791 B1
(45) Date of Patent: *Mar. 10, 2015

(54) METHODS AND APPARATUS FOR PROCESSING MULTI-HEADED PACKETS

(75) Inventors: Ehud Sivan, Zichron Ya'akov (IL); David Melman, D.N. Bikat Beit Hakerem (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 349 days.

This patent is subject to a terminal disclaimer.

(21) Appl. No.: 13/619,441

(22) Filed: Sep. 14, 2012

Related U.S. Application Data

(63) Continuation of application No. 12/260,848, filed on Oct. 29, 2008, now Pat. No. 8,279,871.

(60) Provisional application No. 60/983,383, filed on Oct. 29, 2007.

(51) Int. Cl.
*H04L 12/28* (2006.01)
*H04L 12/933* (2013.01)
*H04L 12/931* (2013.01)

(52) U.S. Cl.
CPC .......... *H04L 49/1546* (2013.01); *H04L 49/602* (2013.01)
USPC ........................................................ 370/392

(58) Field of Classification Search
None
See application file for complete search history.

(56) References Cited

U.S. PATENT DOCUMENTS

| | | | |
|---|---|---|---|
| 7,308,612 B1 | 12/2007 | Bishara | |
| 7,386,699 B1 | 6/2008 | Bishara | |
| 7,424,019 B1 | 9/2008 | Kopelman et al. | |
| 7,571,258 B2 | 8/2009 | Mukund et al. | |
| 7,673,068 B2 | 3/2010 | Bhatia et al. | |
| 2006/0039374 A1* | 2/2006 | Belz et al. | 370/389 |
| 2006/0227779 A1* | 10/2006 | Shimizu | 370/389 |
| 2007/0041373 A1 | 2/2007 | Lor et al. | |
| 2007/0098006 A1 | 5/2007 | Parry et al. | |
| 2007/0183415 A1 | 8/2007 | Fischer et al. | |
| 2007/0201379 A1 | 8/2007 | Kondapalli | |
| 2007/0223388 A1 | 9/2007 | Arad et al. | |
| 2008/0049621 A1* | 2/2008 | McGuire et al. | 370/236.2 |
| 2008/0117913 A1* | 5/2008 | Tatar et al. | 370/392 |
| 2008/0225853 A1 | 9/2008 | Melman et al. | |
| 2008/0240113 A1 | 10/2008 | Arad et al. | |
| 2009/0080431 A1 | 3/2009 | Rekhter | |

OTHER PUBLICATIONS

Office Action in U.S. Appl. No. 12/260,848 dated Mar. 17, 2010.
Final Office Action in U.S. Appl. No. 12/260,848 dated Oct. 29, 2010.
Notice of Allowance in U.S. Appl. No. 12/260,848 dated Feb. 21, 2012.
Notice of Allowance in U.S. Appl. No. 12/260,848 dated Jun. 4, 2012.

* cited by examiner

*Primary Examiner* — Chirag Shah
*Assistant Examiner* — Amar Persaud

(57) ABSTRACT

A packet is received at a network device, the packet having a header that includes destination information for a first network in a first header portion, and destination information for a second network in a second header portion. The packet is processed, in a first pass, to make a first forwarding decision to forward the packet to a destination in the first network based on information contained in the first header portion. The packet is replicated and the packet, or the replicated packet, is returned for processing in a second pass. The packet, or the replicated packet, is processed in the second pass to make a second forwarding decision to forward at least a portion of the packet or the replicated packet to a destination in the second network based on information contained in the second header portion without relying on information contained in the first header portion.

22 Claims, 6 Drawing Sheets

METHODS AND APPARATUS FOR PROCESSING MULTI-HEADED PACKETS

CROSS-REFERENCE TO RELATED APPLICATIONS

The present application is a continuation of U.S. application Ser. No. 12/260,848, entitled "Methods and Apparatus for Processing Multi-Headed Packets," filed on Oct. 29, 2008, now U.S. Pat. No. 8,279,871, which claims the benefit of U.S. Provisional Patent Application No. 60/983,383, entitled "MAC-in-MAC Flooding Using Loopback Port," which was filed on Oct. 29, 2007. Both of the above-referenced applications are hereby incorporated by reference herein in their entireties.

FIELD OF TECHNOLOGY

The present disclosure relates generally to communication networks and, more particularly, to processing packets at an edge bridge device between a first network and a second network.

BACKGROUND

Ethernet was first developed to interconnect computers within a relatively localized area (i.e., a local area network (LAN)). As the popularity of Ethernet increased, Ethernet protocols were extended to permit the use of Ethernet into metropolitan area networks (MANs) and service provider networks. For example, in the Institute for Electrical and Electronics Engineers (IEEE) 802.1ad Standard protocol, a four byte tag was added to the Ethernet frame (the term "frame" is also referred to herein as a "packet") and routing of the frame in the service provider domain is based on this additional tag and the destination media access control (MAC) address in the frame. Also, the IEEE 802.1ah Standard defines an Ethernet frame encapsulation that provides other tags so that routing in the service provider domain need not be based on the MAC address in the Ethernet frame. In this way, the customer and service provider domains can be separated. The IEEE 802.1ah Standard is sometimes referred to as "MAC-in-MAC" or M-in-M.

Network devices, such as bridges and routers, sometimes are implemented using a pipelined architecture. For example, a pipeline in a network device may process packets received by the device and then forward the packets to appropriate egress ports of the device. Because of their pipelined architecture, such network devices may be very efficient. Pipelined network devices that can accommodate hierarchical header structures, such as in M-in-M, are desirable.

SUMMARY

In one embodiment, a method includes receiving, at a network device, a packet having a header that includes (i) destination information for a first network in a first header portion, and (ii) destination information for a second network, different from the first network, in a second header portion. The method also includes processing, in a first pass through a packet processing pipeline of the network device, the packet to make a first forwarding decision to forward the packet to a destination in the first network based on information contained in the first header portion without relying on information in the second header portion, and replicating the packet. Additionally, the method includes returning the packet, or the replicated packet, for processing in a second pass through the packet processing pipeline, and processing, in the second pass through the packet processing pipeline, the packet, or the replicated packet, to make a second forwarding decision to forward at least a portion of (i) the packet or (ii) the replicated packet to a destination in the second network based on information contained in the second header portion without relying on information contained in the first header portion.

In another embodiment, a network device comprises a packet processing pipeline. The packet processing pipeline is configured to process a packet having a header that includes (i) destination information for a first network in a first header portion, and (ii) destination information for a second network, different from the first network, in a second header portion. For example, the packet processing pipeline is configured to process, in a first pass, the packet to make a first forwarding decision to forward the packet to a destination in the first network based on information contained in the first header portion without relying on information in the second header portion. Additionally, the packet processing pipeline is configured to replicate the packet. Also, the packet processing pipeline is configured to return the packet, or the replicated packet, for processing in a second pass through the packet processing pipeline. Further, the packet processing pipeline is configured to process, in the second pass, the packet, or the replicated packet, to make a second forwarding decision to forward at least a portion of (i) the packet or (ii) the replicated packet to a destination in the second network based on information contained in the second header portion without relying on information contained in the first header portion.

DETAILED DESCRIPTION

Embodiments such as the embodiments disclosed herein may have utility in the field of network switches such as Ethernet switches. For instance, an example router will be described that may be employed in various network applications and architectures that support virtual networking strategies such as virtual LAN (VLAN), virtual private network (VPN), and virtual private LAN service (VPLS) technologies. It is noted that a layer 2 VPN may be implemented using VPLS techniques.

A switch may be a boundary (or edge) device disposed between two types of networks in some applications. For example, as described a provider edge bridge (PEB) device may bridge a service provider network backbone network (e.g., that forwards traffic based on traffic service) and an access network (e.g., that forwards traffic based on user ID).

While the following description addresses a situation in which a "customer" network is in network communication with a "service provider" (generally wider area) network, the present disclosure is not intended to be limited in that regard. In particular, other embodiments may have utility in other applications in which a packet is transmitted from a first network domain to a second network domain. It will be appreciated that the systems and methods set forth herein are not limited to any particular network architecture or topography.

Figure 1:
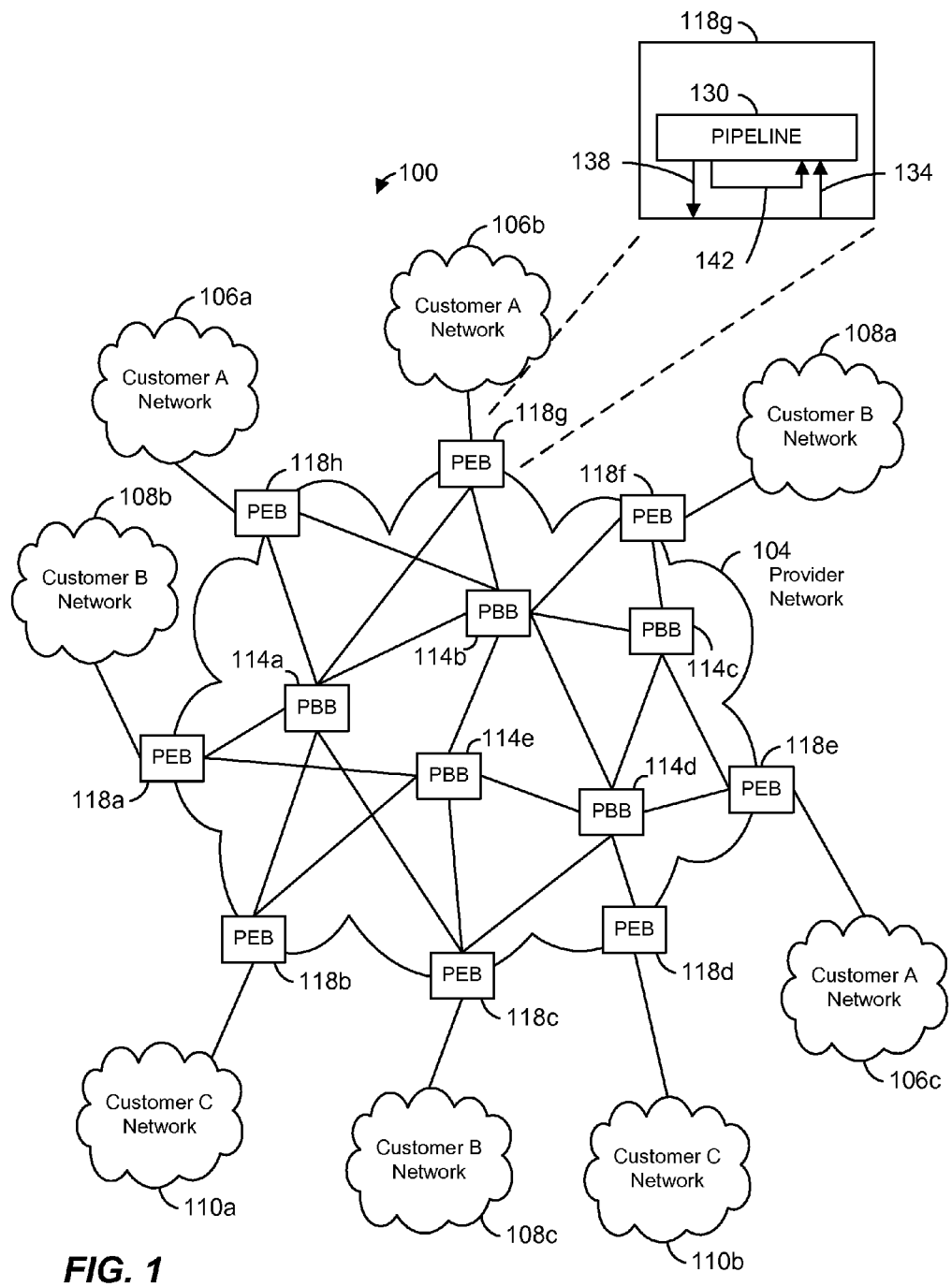
FIG. 1 is a block diagram of a communication network including a provider network that communicatively couples a plurality of customer networks.

FIG. 1 is block diagram of a network 100 including a provider network 104, a plurality of networks 106 of a customer A, a plurality of networks 108 of a customer B, and a plurality of networks 110 of a customer C. The customer network includes a plurality of provider backbone bridge devices (PBBs) 114 and a plurality of provider edge bridge devices (PEBs) 118. The provider network 104 communicatively couples the plurality of networks 106 of Customer A, the plurality of networks 108 of Customer B, and the plurality of networks 110 of Customer C.

When an Ethernet packet, for example, originates in Customer A network 106a and is destined for Customer A network 106b, the Ethernet packet may be encapsulated in an IEEE 802.1ah Standard header at the PEB 118h. Then, the Ethernet packet may be forwarded through the provider network 104 using the information in the IEEE 802.1ah Standard header (i.e., "tunneled" through the provider network 104). When the encapsulated Ethernet packet reaches the PEB 118g, the IEEE 802.1ah Standard header is stripped and the inner Ethernet packet (i.e., the packet without the IEEE 802.1ah Standard header) is forwarded to Customer A network 106b. The term "tunnel termination" is often used to refer to processing that happens to a tunneled frame that has reached a tunnel endpoint. For instance, tunnel termination may include stripping the encapsulating header from the inner packet. In the example described above with respect to FIG. 1, the PEB 118g performs tunnel termination processing, such as stripping the IEEE 802.1ah Standard header from the encapsulated Ethernet packet.

As illustrated in FIG. 1, the PEB 118g includes a packet processing pipeline 130 that processes packets received via one or more ingress ports 134 and forwards the packets to appropriate ones of one or more egress ports 138. The packet processing pipeline 130 is configured to process multi-headed packets, such as M-in-M packets, in multiple passes. For example, in a first pass, the packet processing pipeline 130 may process an encapsulated or multi-headed packet by, for example, analyzing the encapsulating header. Then, the multi-headed packet is provided back to an ingress portion of the pipeline 130, before or after stripping the encapsulating header. In a second pass, the inner packet is processed by, for example, analyzing the header of the inner packet. To facilitate processing the packet in such a manner, the PEB 118g optionally may include an internal loopback port 142. For example, after the first pass, the encapsulated packet (or only the inner packet) may be provided to the ingress portion of the pipeline via the internal loopback port 142. The other PEBs 118 optionally may have the same or a similar structure as the PEB 118g.

Figure 2:
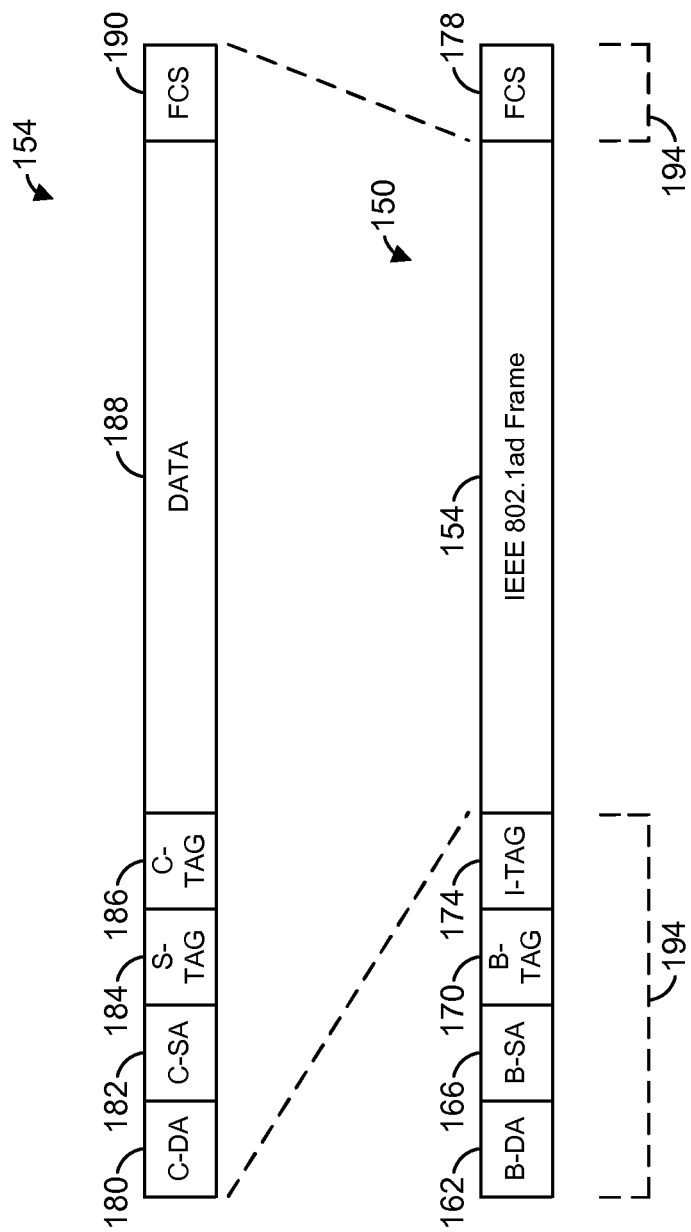
FIG. 2 is a diagram illustrating a data frame that conforms to the Institute of Electrical and Electronics Engineers (IEEE) 802.1ah Standard.

FIG. 2 is a diagram illustrating a packet 150 having multiple hierarchical headers. The frame 150 is compliant with the IEEE 802.1ah standard. The packet 150 includes an Ethernet packet 154 encapsulated within an IEEE 802.1ah header 194. The Ethernet packet 154 may be an IEEE 802.1ad Standard packet, for example, as illustrated in FIG. 2, or any other suitable packet. The IEEE 802.1ah header 194 in FIG. 2 includes a backbone destination address (B-DA) 162, a backbone source address (B-SA) 166, a backbone tag (B-TAG) 170, a service instance tag (I-TAG) 174, and a frame check sequence (FCS) field 178. The B-DA 162 and the B-SA 166 indicate a destination address and a source address, respectively, in the provider network. The B-TAG 170 includes a backbone virtual LAN identifier (B-VID) that indicates a VLAN in the provider domain with which the packet 150 is associated. The I-TAG 174 includes information that indicates the customer associated with the packet 150. The FCS field 178 includes parity information that can be used for error detection and/or error correction.

The IEEE 802.1 ad packet 154 in FIG. 2 includes a customer destination address (C-DA) 180, a customer source address (C-SA) 182, a source tag (S-TAG) 184, a customer tag (C-TAG) 186, a payload field 188, and a frame check sequence (FCS) field 190. The C-DA 180 and the C-SA 182 indicate a destination address and a source address, respectively, in the customer networks. The C-TAG 186 includes a customer VLAN identifier (C-VID) that indicates a VLAN in the customer domain with which the frame 154 is associated. The FCS field 190 includes parity information that can be used for error detection and/or error correction.

When the IEEE 802.1ad packet 154 is to enter the provider domain, it is encapsulated in the IEEE 802.1ah header 194. When the packet 150 leaves the provider domain, the header 194 is stripped from the packet 154. While in the provider domain, the packet 150 may be forwarded using information only in the IEEE 802.1 ah header 194 without examining information in the IEEE 802.1 ad packet 154. The process of forwarding an encapsulated packet through a network using only information in the encapsulating header is often referred to as "tunneling." In this way, the cost and complexity of the provider network may be reduced because equipment in the provider network need not learn the customer source and destination addresses. With a multi-headed packet such as the packet 150, the packet 154 may be referred to as an "inner packet".

Referring now to FIGS. 1 and 2, the B-VID in the B-TAG 170 may identify a "flood domain" in the provider network 104. For example, a bridge device 114 or 118, upon receiving an IEEE 802.1ah Standard packet, may determine that the packet is to be forwarded to potentially all physical ports connected to the provider network 104, except the port on which the packet was received (i.e., the frame is to be "flooded" to the provider ports). Additionally, the bridge device 114 or 118 may learn to omit certain ports to prevent loops in the provider network 104 (e.g., utilizing the rapid spanning tree protocol (RSTP) or the multiple spanning tree protocol (MSTP)). The bridge device 114 or 118 may learn that an IEEE 802.1ah Standard packet should be flooded to a different set of ports depending on the B-VID in the B-TAG 170. Thus, the B-VID in the B-TAG 170 may indicate to the bridge device 114 or 118 the set of ports on which the IEEE 802.1ah Standard packet should be flooded.

As discussed above, the I-TAG 174 includes information that indicates the customer associated with the packet 150. For example, the I-TAG 174 may include a service instance identifier (I-SID) that indicates the particular customer associated with the frame.

Figure 3:
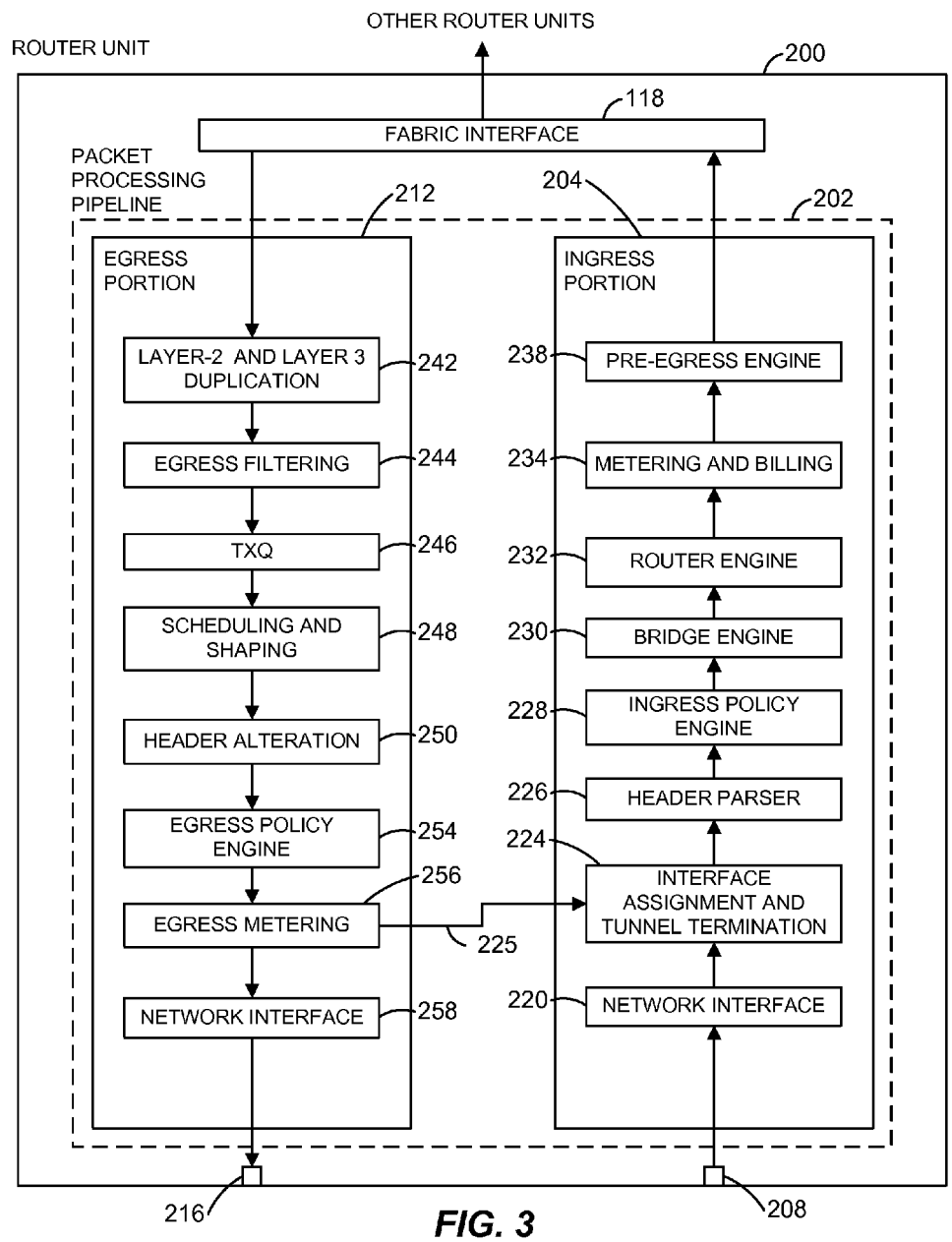
FIG. 3 is a block diagram of an example router unit.

FIG. 3 is a block diagram of an example router unit 200 configured for processing and forwarding data packets that conform to the Institute of Electrical and Electronics Engineers (IEEE) 802.1ah Standard, such as the example packet 150 of FIG. 2. The apparatus of FIG. 3 is referred to as a router because it includes Layer-3 forwarding capabilities in addition to Layer-2 forwarding capabilities. The router unit 200 is configured to support flooding of the IEEE 802.1ah Standard packet, which may include forwarding the IEEE 802.1ah Standard packet to other provider network bridges and forwarding the payload of the IEEE 802.1ah Standard packet to the customer network to which the router unit 200 is coupled, when appropriate. A packet that adheres to the IEEE 802.1ah Standard will hereinafter be referred to as an "M-in-M packet," and the header of an M-in-M packet will hereinafter be referred to as an "M-in-M header." Although examples are described below in the context of processing M-in-M packets, similar techniques may be utilized to process other types of multi-headed packets.

The router unit 200 may be utilized in a provider network such as the example provider network 104 of FIG. 1 as a provider edge bridge device (PEB) such as the PEBs 118 of FIG. 1. As will be described in more detail below, the router unit 200 includes an internal loopback port to facilitate processing of multi-headed or hierarchically headed packets, such as M-in-M packets, at the edge of the provider network. Upon receiving a multi-headed packet, the router unit 200 generally processes the multi-headed packet in a packet processing pipeline by analyzing an external or encapsulating header. When flooding is to be performed (e.g., if the router unit 200 does not know the B-DA or if the B-DA is a multicast address), for example, the router unit 200 then forwards the multi-headed packet back into the provider network. Also, the router unit 200 feeds the multi-headed packet back to the packet processing pipeline via the internal loopback port, and the pipeline then strips the encapsulating header from the multi-headed packet, leaving the inner packet. Next, the pipeline processes the inner packet and forwards the inner packet to the customer network when appropriate (e.g., if the C-DA indicates that the unencapsulated Ethernet frame is destined for a device on the customer network or if the C-DA is a multicast address).

The router unit 200 includes a packet processing pipeline 202 coupled to one or more input circuits 208 and to one or more output circuits 216. The packet processing pipeline may include an ingress portion 204 and an egress portion 212 coupled together via a fabric interface 218, in an embodiment. Optionally, the router unit 200 may be coupled to other router units (not shown) via the fabric interface 218. The plurality of router units may be components of a router device, and the ingress portion 204 may forward packets to egress portions of other pipelines of other router units via the fabric interface 218. Similarly, the egress portion 212 may receive packets from ingress portions of other router units via the fabric interface 218. Although the fabric interface 218 is illustrated as being included in the router unit 218, the fabric interface 218 may be at least partially external to the router unit 200. For example, a plurality of router units, including the router unit 200, may be implemented on a plurality of respective integrated circuits (ICs), and the fabric interface 218 may be at least partially external to the plurality of ICs. Optionally, the fabric interface 218 may be omitted or simplified so that the ingress portion 204 is only capable of forwarding packets to egress portions in the router unit 200, as opposed to forwarding packets to egress portions external to the router unit 200. If the fabric interface 218 is omitted, the ingress portion 204 may be coupled directly to the egress portion 212.

The input circuits 208 and the output circuits 216 may be coupled to a plurality of networks. For example, the input circuits 208 and the output circuits 216 may be coupled to a provider network (e.g., the provider network 104 of FIG. 1) and to one or more customer networks (e.g., one or more of the customer networks 106, 108, 110). As illustrated in FIG. 3, the router unit 200 may be coupled to multiple bridge devices in the provider network. For example, the input circuits 208 and the output circuits 216 may correspond to different physical input and output ports, respectively, of the router unit 200, and a plurality of physical ports may provide multiple 2-way, point-to-point communication links to corresponding multiple bridge devices in the provider network. Similarly, another plurality of physical ports may provide multiple 2-way, point-to-point communication links to corresponding multiple bridge devices in the customer network.

The packet processing pipeline 202 generally transfer packets of data from the input circuits 208 to appropriate ones of the output circuits 216. The one or more input circuits 208 may correspond to one or more input ports of the router unit 200, and the one or more output circuits 216 may correspond to one or more output ports of the router unit 200.

As shown in FIG. 3, the ingress portion 204 and the egress portion 212 each include a plurality of units coupled in series. Generally, each unit of a pipeline optionally processes a packet or a packet descriptor corresponding to the packet and then passes the packet or the packet descriptor to the next unit in the pipeline. A packet descriptor may include some information from the packet, such as some or all of the header information of the packet. The packet descriptor may include other information as well such as an indicator of where the packet is stored in a memory associated with the router unit 200. For ease of explanation, the term "packet" hereinafter may be used to refer to a packet itself or to a packet descriptor associated with the packet. Each unit may or may not process a particular packet. For example, in some instances, a unit may simply forward a packet onto the next unit in the pipeline. The last unit of the ingress portion 204 may pass the packet to the first unit of the egress portion 212 via the fabric interface 218.

Each or at least some of the units of the ingress portion 204 and the egress portion 212 may include, or otherwise be associated with, a corresponding memory. A packet received by a unit may be stored in the memory associated with the unit.

In the example of FIG. 3, the ingress portion 204 includes a network interface unit 220 coupled to the input circuits 208. The network interface unit 220 generally interfaces the ingress portion 204 with a particular physical ingress port of the router unit 200 (i.e., if the router unit 200 includes a plurality of physical ingress ports, the router unit may include a plurality of respective network interface units 220). On the other hand, one network interface unit 220 optionally may interface the ingress portion 204 with a plurality of physical ingress ports of the router unit 200.

An interface assignment and tunnel termination (IATT) unit 224 is coupled to the network interface unit 220. The IATT unit 224 generally indicates to subsequent pipeline units the particular physical or logical ingress port via which a particular packet is received. For example, an indicator of the physical or logical ingress port may be added to a descriptor associated with the packet. Similarly, if a packet is received via the internal loopback port 225, this may be indicated to subsequent pipeline units. Also, the IATT unit 224 generally strips tunnel information from a packet when appropriate. For example, if it is determined that a destination address (B-DA) of a received M-in-M packet matches an address of the router unit 200, the interface assignment and tunnel termination unit 224 may terminate the tunnel, which includes stripping the M-in-M header from the M-in-M packet. Also, if the received M-in-M packet is received from the internal loopback port 225, the IATT unit 224 may terminate the tunnel, which includes stripping the M-in-M header from the M-in-M packet. IATT unit 224 may operate similarly on packets corresponding to other types of tunneling protocols besides M-in-M as well.

Additionally, the IATT unit 224 may generally be operative to identify the structure of an ingressing packet based, for example, on the characteristics of packet content, and to assign a service instance to the ingressing packet according to those characteristics. The IATT unit 224 may employ or access a table of rules, e.g., using a key as an index, to determine how to handle a particular packet. For instance, the key (and thus a table lookup operation) may be based upon any of various factors including, but not limited to: the physical port at which a packet ingressed the router unit 200; an M-in-M header or other encapsulating header; whether the packet is tagged; field values associated with tags of the packet (e.g., VID and priority); and values associated with the VID and priority fields of an inner tag of the packet. In some implementations, the lookup key may be based upon the physical port at which the packet was ingressed, the M-in-M header or other encapsulating header and one or more VID tags in the packet (e.g., Ethernet edge, or Q-in-Q access network). Additionally or alternatively, assignment of the service instance may be based on one or more multiprotocol label switching (MPLS) labels in the packet (e.g., MPLS edge, or Martini tunnels) or an Internet Protocol (IP) tunnel header in the packet.

Given some or all of this information to be used in constructing the key, a table, database, or other data library maintained in a memory component (such as a TCAM) may be consulted to identify a table entry or database record that matches, or closely approximates, the format and structure of the ingressed packet. The identified table entry or database record may include an index that may be employed to retrieve an action entry and the service instance from a separate memory, such as a static random access memory (SRAM); additionally, instructions may be retrieved regarding how to process the packet in accordance with such information. For example, information retrieved from the separate memory (e.g., based upon the index from the data library) may include, in addition to the service instance, quality of service (QoS) and other information associated with how to process the packet. In other implementations, separate memories as discussed above need not be utilized. Rather, a single table may be accessed to retrieve necessary or desired information regarding a packet based upon some or all of the information described above with reference to constructing keys. Alternatively, the data library and separate memory discussed above may be integrated into a single block (such as a table) having different logical memory areas in some implementations.

The IATT unit 224 may subsequently perform operations or issue instructions responsive to the retrieved action entry information. Retrieved data may be employed to assign a packet descriptor that includes data indicative of the service instance assigned to the packet. Additionally, the descriptor may include an indication of the VID for the packet, when appropriate.

In the foregoing manner, the IATT unit 224 may function as a classification engine to classify a packet for subsequent processing. A packet descriptor may be associated with the data packet to influence switching behavior; additionally or alternatively, a packet header may be modified to include information regarding the service instance assignments. This information may be employed by a bridging engine to forward the packet to one or more ports substantially as set forth below.

A header parser unit 226 is coupled to the IATT unit 224 and generally decodes the header of each packet received via the input circuits 208 or the internal loopback port 225. This may include parsing or identifying different segments of the header for use by subsequent units in the packet processing pipeline 202.

An ingress policy engine 228 is coupled to the header parser unit 226. The ingress policy engine 228 generally performs flow classification. For example, the ingress policy engine 228 may attach or otherwise associate a flow identifier to/with a packet to indicate a flow to which the packet belongs.

A bridge engine 230 is coupled to the ingress policy engine 228. The bridge engine 230 includes, or is coupled to, a forwarding database (not shown) that includes MAC destination addresses and indications of the corresponding physical egress ports to which packets having the MAC destination addresses should be forwarded. In particular, the MAC destination addresses may include customer destination addresses (e.g., C-DA's) and backbone destination addresses (B-DA's). In one embodiment, the forwarding database may include a table of MAC destination addresses and indications of the corresponding physical egress ports. In the described embodiment, the table may be segmented, for example, into a first portion having backbone, but not customer, destination addresses (e.g., B-DA's) and a second portion having customer, but not backbone, destination addresses (e.g., C-DA's).

In an embodiment, the bridge engine 230 generally uses Layer-2 information to determine on which port or ports a packet should be forwarded. Determination of whether, and to where a packet should be forwarded, may be done by examining the MAC destination address of the packet and determining to which network segment the destination address corresponds using the forwarding database. Also, other information optionally may be utilized as well, such as one or more of VLAN information, the B-TAG, the I-TAG, etc. Additionally, the bridge engine 230 may be capable of determining destinations for Layer-2 multicast packets. For example, the bridge engine 230 may utilize the B-TAG field of an M-in-M packet to determine on which provider network connected ports the frame should be forwarded. The bridge engine 230 also may maintain the forwarding database.

In general, the forwarding database may correlate several variables useful for making forwarding decisions. The forwarding database may comprise entries based upon VID and MAC address, for instance; lookup operations based upon MAC address and VID may be useful in standard bridging operations. The bridge engine 230 may make forwarding decisions also using information provided by the IATT unit 224. Thus, the forwarding database records or table entries may be extended to include fields associated with an ID provided by the IATT unit 224, physical ingress port identification, service instance, or a combination of these.

Bridge engine 230 may perform one or more lookup operations with respect to the forwarding database to determine how to handle a packet in accordance with information from the IATT unit 224. In particular, it may be desirable that a lookup algorithm employ a MAC address and information in the descriptor generated by the IATT unit 224 to perform a lookup operation with respect to the forwarding database. A MAC DA may be employed for forwarding operations, while a MAC source address SA may be employed for learning operations.

When an M-in-M packet is received by the bridge engine 230, and when the M-in-M packet is to flooded, the bridge engine 230 may determine a set of one or more ports to which the M-in-M packet is to be forwarded by use of, for example, a forwarding database lookup based on the B-DA and the B-VID in the M-in-M header. The set of one or more ports may include the internal loopback port 225 and a set of physical egress ports coupled to the provider network 104. An indicator of the determined set of one or more ports may be included in or attached to a descriptor associated with the packet, or the indicator of the determined set of one or more ports may be attached to the packet for use by subsequent units of the pipeline 202.

A router engine 232 is coupled to the bridge engine 230. If a received packet is not destined for a network to which the router unit 200 is connected, then routing based on an Internet Protocol (IP) address may be performed. The router engine 232 includes, or is coupled to, a routing information database (not shown) that includes information corresponding to where IP packets should be forwarded. The router engine 232 generally determines to where a received IP packet should be routed. This may be done by examining the IP destination address of the packet and routing information stored in the routing information database. The router engine 232 also maintains the routing information database. Additionally, the router engine 232 may be capable of determining destinations for IP multicast packets.

A metering and billing engine 234 may be coupled to the router engine 232. The metering and billing engine 234 generally makes flow traffic measurements. The metering and billing engine 234 also may sample packets.

A pre-egress engine 238 may be coupled to the metering and billing engine 238. The pre-egress engine 238 may consolidate decisions of previous units in the ingress portion 204 into a single decision, and updates the descriptor of the packet accordingly. In an embodiment in which the router unit 200 includes a CPU and an analyzer (not shown in FIG. 3) coupled to the pipeline 202, the pre-egress engine 238 may duplicate a packet to the CPU and/or the analyzer when applicable.

In embodiments that include the fabric interface 218, the egress portion 212 may be coupled to the pre-egress engine 238 via the fabric interface 218. In particular, Layer-2 and Layer-3 multicast duplication unit 242 may be coupled to the pre-egress engine 238. Upon egress, router unit 200 may be required to transmit a packet to multiple locations, i.e., a single packet may be replicated a number of times. For example, broadcast and multicast packets must be transported multiple times; where the MAC DA for a packet is unknown or not stored in the forwarding database, the packet must be flooded to every port in the flood domain. In the illustrated embodiment of router unit 200, the Layer-2 and Layer-3 multicast duplication unit 242 may be responsible for local broadcast/multicast replication.

When an M-in-M packet is received by the Layer-2 and Layer-3 multicast duplication unit 242, the Layer-2 and Layer-3 multicast duplication unit 242 may create duplicates of the M-in-M packet for forwarding to the set of one or more ports determined by the bridge engine 230. As discussed above, the set of one or more ports may include the internal loopback port 225 and a set of physical egress ports coupled to the provider network 104.

In one embodiment, the Layer-2 and Layer-3 multicast duplication unit 242 may utilize a downstream interface table (DIT) having table entries or database records related to a set of ports for a packet as described above. The DIT may be stored in a memory included in or coupled to the Layer-2 and Layer-3 multicast duplication unit 242. For packets to be flooded, multiple DIT lookup operations may be performed to ascertain egress information associated with each egress port via which the packets are to be transmitted. For example, the DIT entries may indicate whether a particular egress physical port is coupled with a logical port. This information may be utilized to filter traffic coming from the same logical port as identified by the IATT unit 224, for example.

An egress filtering unit 244 may be coupled to the Layer-2 and Layer-3 multicast duplication unit 242. Certain split horizon protocols dictate that an ingress edge device may be required to flood an incoming packet to customer interfaces but not to other provider interfaces. For example, IATT unit 224 may assign an attribute or packet descriptor that indicates whether an ingress interface for the packet that is currently being processed is associated with a provider edge device. Additionally, a table entry or database record may identify whether an egress interface is associated with a provider edge device. If the downstream interface is a provider edge device, and the attribute associated with the packet identifies the ingress interface from which it was received as a provider edge device, the packet may not be forwarded to the downstream edge device (i.e., it may be dropped); alternatively, if the ingress interface is not associated a provider edge device, then the packet may be forwarded in accordance with other information maintained in the attribute or packet descriptor.

A transmit queuing unit 246 is coupled to the egress filtering unit 244. The transmit queuing unit 246 generally queues packets in a plurality of queues corresponding to different classes of flows, for example.

A scheduling and shaping unit 248 is coupled to the transmit queuing unit 246. A header alteration unit 250 is coupled to the scheduling and shaping unit 248. A packet received at an edge device for transmission across a provider network to a customer network domain may generally have a VLAN field and MAC field in a packet header. In some customer or subnetwork implementations, it may be necessary to modify the VLAN field (e.g., depending upon the VLAN associated with the MAC DA) or to multicast the packet to destination devices in different VLANs. It is noted that modification of a packet header may occur upon ingress to the provider network or upon egress from the provider network. The header alteration unit 250 may maintain information allowing a packet header to be appropriately manipulated to facilitate such multicast operations. In some implementations, the header alteration unit 250 may manipulate the packet independently or in cooperation with other units of the egress portion 212. The header alteration unit 250 may enable control of tagging for customer networks or other subnetwork implementations. To support this functionality, the header alteration unit 250 may be embodied in or comprise a lookup table, database, or other suitable data structure correlating packet attribute information, VIDs, MAC addresses, and customer VLAN tagging preferences. Additionally, the header alteration unit 250 may point to a tunnel start entry which provides information regarding the required external header for a packet; in that regard, a tunnel start entry may define a tunnel to be used to transmit the packet across the provider network.

An egress policy engine 254 is coupled to the header alteration unit 250. The egress policy engine 254 generally performs flow classification. If the packet belongs to an existing flow, the egress policy engine 254 will determine the existing flow to which the packet belongs. For example, the egress policy engine 254 may attach a flow identifier to a packet to indicate a flow to which the packet belongs.

An egress metering unit 256 may be coupled to the egress policy engine 254. The egress metering unit 256 generally makes flow traffic measurements. A network interface unit 258 is coupled to the egress metering unit and is coupled to the output circuits 216. The network interface unit 258 generally interfaces the egress portion 212 with a particular physical egress port of the router unit 200 (i.e., if the router unit 200 includes a plurality of physical egress ports, the router unit may include a plurality of respective network interface units 258). On the other hand, one network interface unit 258 optionally may interface the egress portion 212 with a plurality of physical egress ports of the router unit 200.

As mentioned above, the router unit 200 includes the internal loopback port 225, which couples a downstream location of the pipeline 202 with an upstream location in the pipeline 202. For example, the loopback port 225 may couple the egress portion 212 with the ingress portion 204. In an embodiment, the internal loopback port 225 may couple the egress metering unit 256 to the interface assignment and tunnel termination unit 224. The loopback port 225 may couple to different locations in the pipeline 202 as well. As will be described in more detail below, the internal loopback port 225 permits an M-in-M packet to be looped back from a downstream location in the packet processing pipeline 202 (e.g., in the egress portion 212) to an upstream location in the pipeline 202 (e.g., in the ingress portion 204). The loopback port 225 generally permits a multi-headed packet (e.g., an M-in-M packet), to be processed a second time by the pipeline 202 to permit the pipeline 202 to process the header of the inner packet. In other words, in a first pass through the pipeline 202, the multi-headed packet may be processed by the pipeline 202, whereby the pipeline 202 processes the encapsulating header. As a result of the processing in the first pass, the pipeline 202 may forward the multi-headed packet to a set of one or more egress ports. Also, the multi-headed packet (or merely the inner packet) is fed back to an upstream location in the pipeline 202 via the loopback port 225, for example. Next, in a second pass through the pipeline 202, the inner packet may be processed by the pipeline 202, whereby the pipeline 202 processes the inner header. As a result of the processing in the second pass, the pipeline 202 may forward the inner packet to a set of one or more egress ports. In a mode in which an M-in-M packet is to be flooded, the M-in-M packet may be processed by the pipeline 202, whereby the pipeline 202 processes the encapsulating header. As a result of the processing in the first pass, the pipeline 202 may forward the M-in-M packet to a set of one or more egress ports via which the M-in-M packet is to be flooded. Also, the M-in-M packet (or merely the inner packet) is fed back to an upstream location in the pipeline 202 via the loopback port 225, for example. Next, in a second pass through the pipeline 202, the inner packet may be processed by the pipeline 202, whereby the pipeline 202 processes the inner header. As a result of the processing in the second pass, the pipeline 202 may forward the inner packet to a set of one or more egress ports via which the inner packet is to be flooded. Thus, the internal loopback port 225 is one technique for permitting the ingress portion 204 to process the M-in-M packet a second time so as to analyze the inner packet of the M-in-M packet, as compared to the first analysis of the M-in-M packet in which the inner packet was not analyzed, but rather forwarding decisions were based on an analysis of the encapsulating header.

Figure 4A:
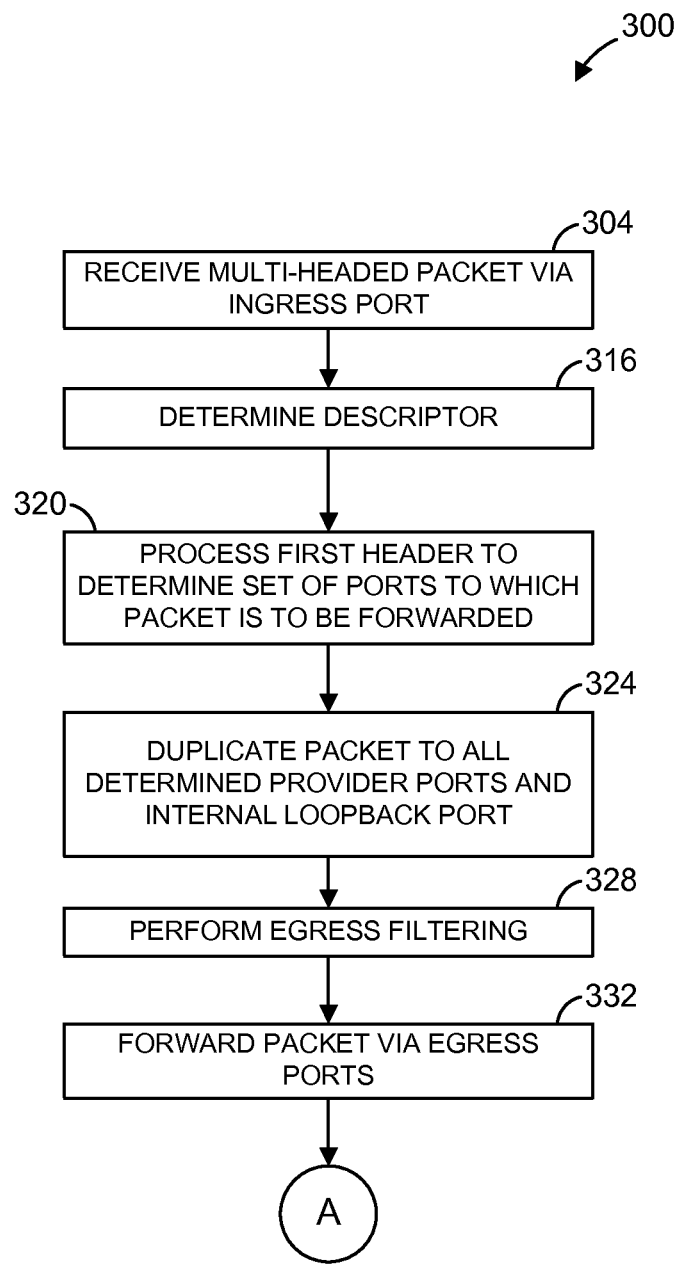
FIGS. 4A and 4B are a flow diagram of an example method for processing a packet using a bridge device such as the router unit of FIG. 3.
Figure 4B:
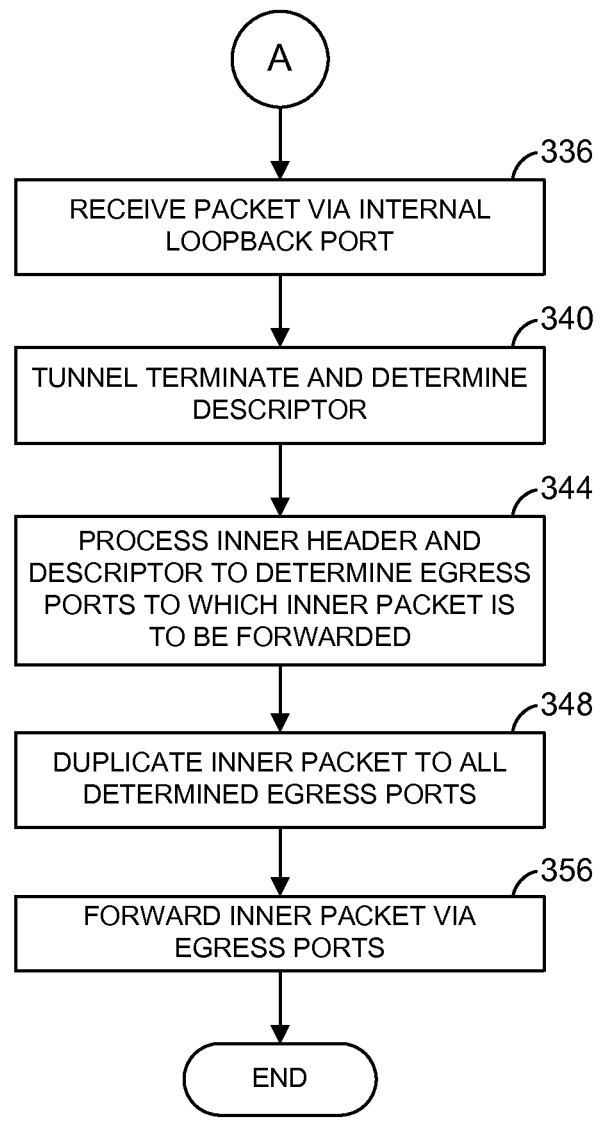

FIGS. 4A and 4B are a flow diagram of an example method 300 for processing a multi-headed packet, such as an M-in-M packet, in a bridge device, such as the router unit 200 of FIG. 3, having an internal loopback port between an upstream location (e.g., an ingress portion) and a downstream location (e.g., an egress portion) in a packet processing pipeline. For ease of explanation, the method 300 will be described with reference to the router unit 200 of FIG. 3. It will be understood, however, that the method 300 may be implemented by bridge devices other than the router unit 200, and that the router unit 200 may implement methods different than the method 300.

At block 304, a multi-headed packet, such as an M-in-M packet, is received via an ingress port. In the router device 200, for example, the IATT unit 224 may receive an M-in-M packet via an ingress port, and via the network interface 220. At block 316, a descriptor for the multi-headed packet received at block 304 may be determined. The descriptor may include information indicating the particular port via which the multi-headed packet was received, as well as other information. For example, if the received packet is an M-in-M packet, other information may include an indication of whether the M-in-M packet was received from a PE device.

Blocks 304 and 316 may be implemented, at least partially, by the IATT unit 224. For M-in-M packets as an example, the IATT unit 224 may receive an M-in-M packet and determine whether it is to be flooded. Additionally, the IATT unit 224 implements tunnel termination and may generate a descriptor (block 316) as described above.

At block 320, an outer header of the multi-headed packet may be processed to determine a set of one or more ports via which the multi-headed packet is to be forwarded. The set of one or more ports may include one or more egress ports and the internal loopback port. Block 320 may include using Layer-2 information in the outer header to determine the set of one or more ports. For example in which an M-in-M packet is to be processed, determining the set of one or more ports may include accessing a forwarding database based on the B-DA and the B-VID, for example. The forwarding database may include a table having B-DA and B-VID pairs, and indications of the corresponding physical or logical egress ports (and the internal loopback port) to which packets having the B-DA and B-VID pair should be forwarded. In one embodiment, the table may be segmented into a first portion having backbone, but not customer, destination addresses (e.g., B-DA's) and a second portion having customer, but not backbone, destination addresses (e.g., C-DA's). In this embodiment, block 320 may include accessing the first portion of the table.

Block 320 may be implemented, at least partially, by the bridge engine 320. For instance, when an M-in-M packet is received by the bridge engine 230, and when the M-in-M packet is to flooded, the bridge engine 230 may determine a set of one or more ports to which the M-in-M packet is to be forwarded by use of, for example, a forwarding database lookup based on the B-DA and the B-VID in the M-in-M header. The set of ports may include the internal loopback port 225 and a set of one or more physical or logical egress ports coupled to the provider network 104. The bridge engine may store the indicator of the determined set of ports in or attach it to a descriptor associated with the packet, or the indicator of the determined set of ports may be attached to the packet for use by the egress portion 212.

At block 324, the multi-headed packet may be duplicated to all ports indicated by the set of one or more ports determined at block 320. Block 324 may be implemented by the layer-2 and layer-3 duplication unit 242, for example.

At block 328, egress filtering may be performed. Block 328 may be implemented by the egress filtering unit 244, for example.

At block 332, the multi-headed packet may be egressed by the set of one or more ports determined at the block 320 and filtered at the block 328. The block 332 includes sending the multi-headed packet to the ingress portion of the pipeline 202 via the internal loopback port 225.

At block 336, the multi-headed packet (or merely the inner packet) is received by the ingress portion via the internal loopback port 225. In one example, the encapsulating header may be stripped from the multi-headed packet prior to being received by the ingress portion. For example, the encapsulating header may be stripped in the egress portion of the pipeline, or in the internal loopback port. As another example, the encapsulating may not be stripped prior to providing the multi-headed packet to the ingress portion of the pipeline. For example, the encapsulating header may be stripped as part of a tunnel termination function in the ingress portion of the pipeline. The IATT unit 224 may receive the multi-headed packet via the internal loopback port 225. At block 340, tunnel termination processing may be performed and a descriptor for the inner packet may be determined. For example, the IATT unit 224 may perform tunnel termination processing and may determine a descriptor for the inner packet. The IATT unit 224 may perform such processing when a multi-headed packet, such as an M-in-M packet, is received from the internal loopback port 225. In an embodiment, the IATT unit 224 may perform tunnel termination processing when a received packet includes an IEEE 802.1q tag, the received packet's second tag Ethertype is the Ethertype configured for M-in-M, and the port from which the packet was received is enabled for M-in-M tunnel termination processing. Tunnel termination processing may include stripping the M-in-M header from the inner packet.

At block 340, the IATT unit 224 generally determines how the multi-headed packet received via the internal loopback port 225 should be handled. As discussed above, this may include determining a table lookup key. The key may be determined using information in the outer header of the multi-headed packet, for example. In an M-in-M packet, for example, information in the I-TAG may be utilized in generating the key. Using the key, the IATT unit 224 may assign a packet descriptor to the inner packet that includes data indicative of the service instance assigned to the packet. Additionally, the descriptor may include an indication of the VID for the packet, when appropriate.

At block 344, the inner packet header and the descriptor may be processed to determine a set of one or more ports to which the payload packet is to be forwarded. The block 344 may be implemented by the bridge engine 230. As discussed above, the Bridge engine 230 may perform one or more lookup operations with respect to the forwarding database to determine how to handle a packet in accordance with information from the inner packet header and the descriptor generated by the IATT unit 224. For example, a lookup algorithm may employ the C-DA and information that serves as a VPN-ID logically to separate forwarding database entries by service instance. In other words, the C-DA and the VPN-ID may correspond to the set of ports to which the inner packet should be forwarded. At block 356, the inner packet may be egressed by the set of ports determined at the block 344.

Figure 5:
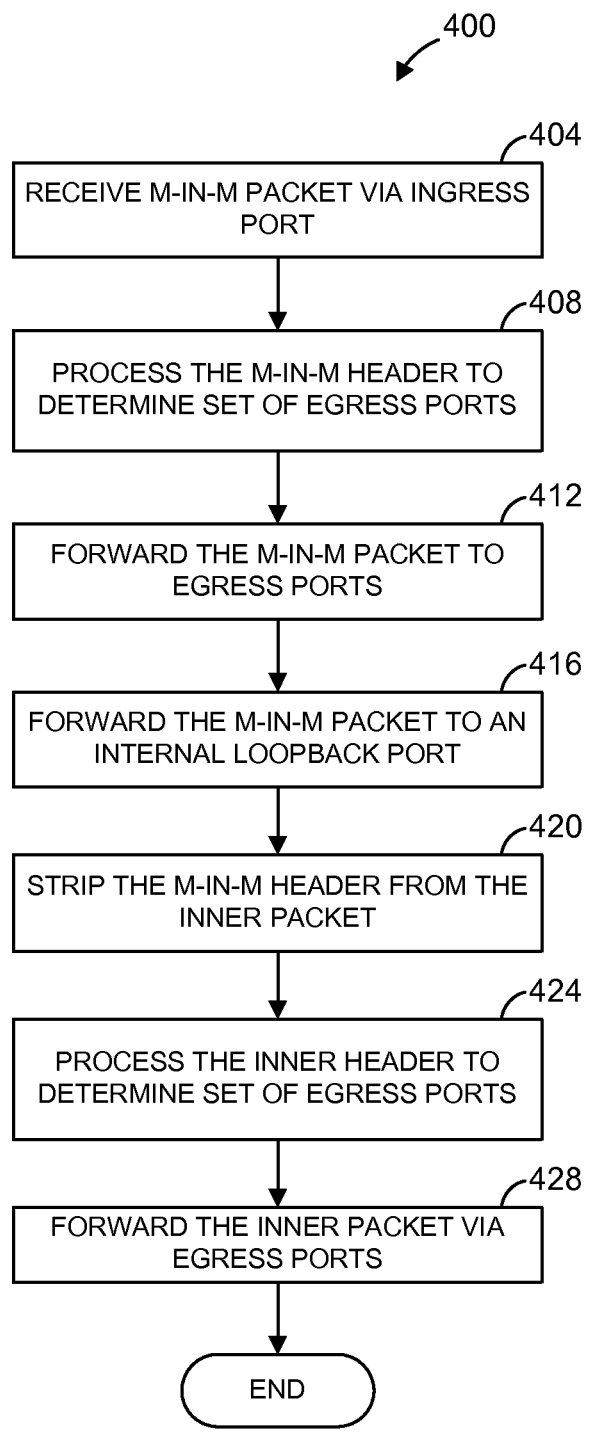
FIG. 5 is a flow diagram of an example method for processing a packet using a bridge device.

FIG. 5 is a flow diagram of an example method 400 for processing an M-in-M packet in a bridge device, such as the router unit 200 of FIG. 3, having an internal loopback port between an ingress portion and an egress portion of a packet processing pipeline. Referring again to FIGS. 4A and 4B, the method 300 is merely one embodiment of the method 400 of FIG. 5. Although the method 400 may be implemented by the router unit 200 of FIG. 3, for example, it will be understood that the method 400 may be implemented by bridge devices other than the router unit 200. More generally, the method 400 may be implemented by a bridge device having a packet processing pipeline having an ingress portion, an egress portion, and an internal loopback port between the ingress portion and the egress portion. Additionally, the bridge device may include ports for receiving packets from and sending packets to a first network, such as a provider network, and may include ports for receiving packets from and sending packets to a second network, such as a customer network. For ease of explanation, the first network will be referred to as a provider network and the second network will be referred to as a customer network.

The method 400 is a method for processing an M-in-M packet. Generally speaking, the M-in-M packet is processed in two passes. In a first pass, the packet processing pipeline processes the M-in-M header to determine a set of one or more ports via which the packet is to be egressed. The M-in-M packet is then egressed by the set of one or more ports. Additionally, the egress portion of the pipeline provides the M-in-M packet back to the ingress portion via the internal loopback port. In a second pass, the ingress portion of the pipeline strips the M-in-M header and processes the inner packet header to determine a set of one or more ports via which the packet is to be egressed. The egress pipeline then egresses the M-in-M packet by the set of one or more ports.

At block 404, an M-in-M packet is received via an ingress port. At block 408, the M-in-M header of the M-in-M packet is processed to determine a set of one or more ports via which the M-in-M packet is to be egressed. At block 412, the M-in-M packet is forwarded to the set of one or more ports. Optionally, egress filtering may be applied subsequent to block 408 so that, at block 412, the M-in-M packet is forwarded to less than all of the ports in the set determined at block 408. Alternatively, egress filtering may be combined with block 408 so that the determined set of ports is already filtered.

At block 416, the M-in-M packet is also forwarded to an internal loopback port between the ingress portion and the egress portion. At block 420, the ingress portion processes the M-in-M packet received via the loopback port. If the M-in-M header has not already been stripped, the ingress portion may strip the M-in-M header from an inner packet of the M-in-M packet.

At block 424, a header of the payload packet is processed to determine a set of one or more ports via which the inner packet is to be forwarded. The set of one or more ports may be determined further based on information in or determined from the M-in-M header. For example, the set of one or more ports may be determined further based on an I-SID in an I-TAG of the M-in-M header.

At block 428, the inner packet is egressed by the set of one or more ports. Optionally, egress filtering may be applied subsequent to block 424 so that, at block 428, the inner packet is forwarded to less than all of the ports in the set determined at block 424. Alternatively, egress filtering may be combined with block 424 so that the determined set of one or more ports is already filtered.

The apparatus and method blocks described above may be implemented in hardware, software or firmware, or some combination of hardware, software and/or firmware. When implemented in hardware, the blocks, operations, techniques, etc., may be implemented in, for example, a custom integrated circuit (IC), an application specific integrated circuit (ASIC), a field programmable logic array (FPGA), a programmable logic array (PLA), etc. When implemented in software, the software may be stored in any computer readable storage medium such as a magnetic disk, an optical disk, a RAM, a ROM, a flash memory, a tape drive, etc.

The present invention may be embodied in any type of router or network bridge device used in a wired and/or wireless communication system including, for example, ones used in communication systems including or coupled to one or more of a wired local area network, a wireless local area network, a wired metropolitan area network, a wireless metropolitan area network, a wired wide area network, a wireless wide area network, the Internet, etc.

Moreover, while the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method, comprising:
   receiving, at a network device, a packet having a header that includes
   (i) in a first portion of the header, destination information for a first network, and
   (ii) in a second portion of the header, destination information for a second network, wherein the second network is different from the first network;
   processing, in a first pass through a packet processing pipeline of the network device, the packet to make a first forwarding decision to forward the packet to a destination in the first network based on the destination information contained in the first portion of the header without relying on the destination information in the second portion of the header;
   replicating the packet, wherein the replicated packet also includes the first portion of the header and the second portion of the header;
   returning the packet, or the replicated packet, for processing in a second pass through the packet processing pipeline; and
   processing, in the second pass through the packet processing pipeline, the packet, or the replicated packet, to make a second forwarding decision to forward at least a portion of (i) the packet or (ii) the replicated packet to a destination in the second network based on the destination information contained in the second portion of the header without relying on the destination information contained in the first portion of the header.

2. A method according to claim 1, wherein:
   the packet includes an inner packet; and
   the first portion of the header encapsulates the second portion of the header.

3. A method according to claim 2, further comprising stripping the first portion of the header from the packet (i) after processing the packet to make the first forwarding decision and (ii) before processing the packet to make the second forwarding decision.

4. A method according to claim 1, wherein:
   the first forwarding decision to forward the packet to the destination in the first network includes a decision to forward the packet to a first set of egress ports; and
   the second forwarding decision to forward at least the portion of (i) the packet or (ii) the replicated packet to the destination in the second network includes a decision to forward at least the portion of (i) the packet or (ii) the replicated packet to a second set of egress ports.

5. A method according to claim 4, wherein:
   the second set of egress ports includes egress ports coupled to the second network;
   the first network is a provider backbone network; and
   the second network is a customer network.

6. A method according to claim 1, wherein processing the packet to make the first forwarding decision is based on a backbone destination address (B-DA) in the first portion of the header.

7. A method according to claim 6, wherein processing the packet to make the first forwarding decision is further based on a backbone virtual local area network identifier (B-VID).

8. A method according to claim 1, wherein processing the packet to make the first forwarding decision includes:
   determining an initial first set of one or more egress ports; and
   filtering the initial first set of one or more egress ports.

9. A method according to claim 1, wherein processing the packet to make the second forwarding decision is based on a destination address (DA) in the second portion of the header.

10. A method according to claim 1, wherein processing the packet to make the second forwarding decision includes:
    determining an initial second set of one or more egress ports; and
    filtering the initial second set of one or more egress ports.

11. A network device, comprising:
    a packet processing pipeline hardware device configured to
    process, in a first pass through the packet processing pipeline, a packet to make a first forwarding decision to forward the packet to a destination in a first network based on destination information contained in a first portion of a header of the packet without relying on destination information in a second portion of the header,
    replicate the packet, wherein the replicated packet also includes the first portion of the header and the second portion of the header,
    return the packet, or the replicated packet, for processing in a second pass through the packet processing pipeline, and
    process, in the second pass through the packet processing pipeline, the packet, or the replicated packet, to make a second forwarding decision to forward at least a portion of (i) the packet or (ii) the replicated packet to a destination in the second network based on the destination information contained in the second portion of the header without relying on the destination information contained in the first portion of the header, wherein the second network is different from the first network.

12. A network device according to claim 11, wherein:
    the packet processing pipeline includes an ingress portion coupled to a plurality of ingress ports and an egress portion coupled to a plurality of egress ports; and
    the packet processing pipeline is configured to return the packet, or the replicated packet, for processing in the second pass through the packet processing pipeline by forwarding the packet, or the replicated packet, from the egress portion to the ingress portion.

13. A network device according to claim 12, wherein:
    the packet processing pipeline includes an internal loopback port between the ingress portion and the egress portion; and
    the packet processing pipeline is configured to forward the packet, or the replicated packet, from the egress portion to the ingress portion using the internal loopback port.

14. A network device according to claim 11, wherein:
    the packet includes an inner packet; and
    the first portion of the header encapsulates the second portion of the header.

15. A network device according to claim 11, wherein the packet processing pipeline is further configured to strip the first portion of the header from the packet (i) after processing the packet to make the first forwarding decision and (ii) before processing the packet to make the second forwarding decision.

16. A network device according to claim 11, wherein:
    the first forwarding decision to forward the packet to the destination in the first network includes a decision to forward the packet to a first set of egress ports; and the second forwarding decision to forward at least the portion of (i) the packet or (ii) the replicated packet to the destination in the second network includes a decision to forward at least the portion of (i) the packet or (ii) the replicated packet to a second set of egress ports.

17. A network device according to claim 16, wherein:
the second set of egress ports includes egress ports coupled to the second network;
the first network is a provider backbone network; and
wherein the second network is a customer network.

18. A network device according to claim 11, wherein the packet processing pipeline is configured to process the packet to make the first forwarding decision based on a backbone destination address (B-DA).

19. A network device according to claim 18, wherein the packet processing pipeline is configured to process the packet to make the first forwarding decision further based on a backbone virtual local area network identifier (B-VID).

20. A network device according to claim 11, wherein the packet processing pipeline is configured to process the packet to make the second forwarding decision based on a destination address (DA).

21. A network device according to claim 11, wherein the packet processing pipeline is configured to utilize a forwarding table segmented into a first portion having destination addresses in the first network and without destination addresses in the second network, and at least a second portion having destination addresses in the second network and without destination addresses in the first network.

22. A network device according to claim 11, further comprising a fabric interface, wherein an ingress portion of the packet processing pipeline is coupled to an egress portion of the packet processing pipeline via the fabric interface.

* * * * *